(12) United States Patent
Kubota et al.

(10) Patent No.: US 11,316,466 B2
(45) Date of Patent: Apr. 26, 2022

(54) ONBOARD FLUID MACHINE AND METHOD FOR CONTROLLING ONBOARD FLUID MACHINE

(71) Applicant: KABUSHIKI KAISHA TOYOTA JIDOSHOKKI, Kariya (JP)

(72) Inventors: Masashi Kubota, Kariya (JP); Takashi Kawashima, Kariya (JP); Kazuki Najima, Kariya (JP)

(73) Assignee: KABUSHIKI KAISHA TOYOTA JIDOSHOKKI, Kariya (JP)

( * ) Notice: Subject to any disclaimer, the term of this patent is extended or adjusted under 35 U.S.C. 154(b) by 56 days.

(21) Appl. No.: 16/368,223

(22) Filed: Mar. 28, 2019

(65) Prior Publication Data

US 2019/0305711 A1 Oct. 3, 2019

(30) Foreign Application Priority Data

Mar. 30, 2018 (JP) .............................. JP2018-070140

(51) Int. Cl.
*H02P 27/12* (2006.01)
*B60H 1/32* (2006.01)
*H02P 21/22* (2016.01)
*H02P 21/18* (2016.01)

(52) U.S. Cl.
CPC ........... *H02P 27/12* (2013.01); *B60H 1/3226* (2013.01); *H02P 21/18* (2016.02); *H02P 21/22* (2016.02)

(58) Field of Classification Search
CPC .......... H02P 27/12; H02P 21/18; H02P 21/22; B60H 1/3226

USPC .......................................................... 318/400
See application file for complete search history.

(56) References Cited

U.S. PATENT DOCUMENTS

| | | | |
|---|---|---|---|
| 10,439,536 B2 * | 10/2019 | Lee | H02P 21/18 |
| 10,498,283 B2 * | 12/2019 | Mitsui | H02P 21/22 |
| 10,634,707 B2 * | 4/2020 | Mariethoz | G01R 25/00 |
| 10,637,381 B2 * | 4/2020 | Shigeta | H02P 21/22 |
| 2007/0046249 A1 * | 3/2007 | Tomigashi | H02P 21/18 318/807 |
| 2009/0261774 A1 * | 10/2009 | Yuuki | H02K 1/2766 318/720 |
| 2014/0062353 A1 * | 3/2014 | Oyobe | H02P 21/22 318/400.02 |
| 2016/0285396 A1 | 9/2016 | Najima | |

(Continued)

FOREIGN PATENT DOCUMENTS

| | | | |
|---|---|---|---|
| JP | 2001-327186 A | | 11/2001 |
| JP | 2013-126352 | | 6/2013 |
| JP | 2013126352 A | * | 6/2013 |

(Continued)

*Primary Examiner* — Muhammad S Islam
*Assistant Examiner* — Devon A Joseph
(74) *Attorney, Agent, or Firm* — Sughrue Mion, PLLC (57) ABSTRACT

A rotation angle estimation unit calculates a rotation angle of a rotor from a d-axis current and a q-axis current that flow into a motor of an onboard fluid machine and from a d-axis voltage command value and a q-axis voltage command value. A correction unit of an inverter device applies a pulse voltage to the motor when the motor is in a stopped state. Further, the correction unit corrects a parameter for control of the motor in accordance with a comparison result of the d-axis current and the q-axis current, which flow into the motor when the pulse voltage is applied.

6 Claims, 10 Drawing Sheets

(56) References Cited

U.S. PATENT DOCUMENTS

2017/0279392 A1* 9/2017 Fukushige .......... H02P 21/0003
2018/0102723 A1* 4/2018 Kawashima ............ H02P 21/22

FOREIGN PATENT DOCUMENTS

| JP | 2016-185040 A | 10/2016 |
| JP | 2017-184594 A | 10/2017 |
| WO | 2017/199334 A1 | 11/2017 |

* cited by examiner

ONBOARD FLUID MACHINE AND METHOD FOR CONTROLLING ONBOARD FLUID MACHINE

BACKGROUND

The present disclosure relates to an onboard fluid machine and a method for controlling an onboard fluid machine.

Motor control includes position sensorless control for controlling a motor while estimating the rotation angle (rotation position) of the rotor. Japanese Laid-Open Patent Publication No. 2016-185040 describes an example of a controller that performs sensorless control. The controller applies voltage having a predetermined pulse width to phase coils in a positive direction and a negative direction to obtain the position of the rotor based on the current supplied when the voltage is applied.

SUMMARY

It is an object of the present disclosure to provide an onboard fluid machine and a method for controlling an onboard fluid machine capable of reducing the size of a motor.

Examples of the present disclosure will now be described.

Example 1

An onboard fluid machine including an inverter device and a motor is provided. The inverter device includes an inverter circuit having a switching element, the inverter circuit being configured to supply the motor with alternating-current power, a current controller configured to calculate a d-axis voltage command value and a q-axis voltage command value, and a rotation angle estimation unit configured to calculate a rotation angle of a rotor of the motor from a d-axis current and a q-axis current that flow into the motor and from the d-axis voltage command value and the q-axis voltage command value. The inverter device further includes a correction unit. The correction unit is configured to apply a pulse voltage to the motor when the motor is in a stopped state and correct a parameter for control of the motor in accordance with a comparison result of the d-axis current and the q-axis current, which flow into the motor when the pulse voltage is applied.

In the above-described configuration, when the motor is in a stopped state, pulse voltages are applied to the motor. In the above-described configuration, the saliency ratio (q-axis inductance/d-axis inductance) is estimated in accordance with the comparison result of the d-axis current and the q-axis current, which flow into the motor when the pulse voltages are performed. This indirectly detects the inductance of the motor. In the above-described configuration, the parameter for the control of the motor is corrected based on the estimated saliency ratio. Thus, the steady-state errors between the control phase and the maximum torque phase in the rotation of the rotor are reduced. This limits decreases in the output torque, sets the torque margin to be small, and reduces the size of the motor. The above-described saliency ratio estimation is to indirectly detect the inductance of the motor. The above-described estimation of the saliency ratio involves the use of larger changes in the q-axis inductance than in the d-axis inductance in accordance with the changes in the amount of the magnetic fluxes of the magnets. Additionally, in the present embodiment, the comparison result of the d-axis current and the q-axis current is used to correct the parameter for the control of the motor. This allows errors in the gain of the current sensors to be cancelled. As a result, correction values can be calculated more accurately.

Figure 11A:
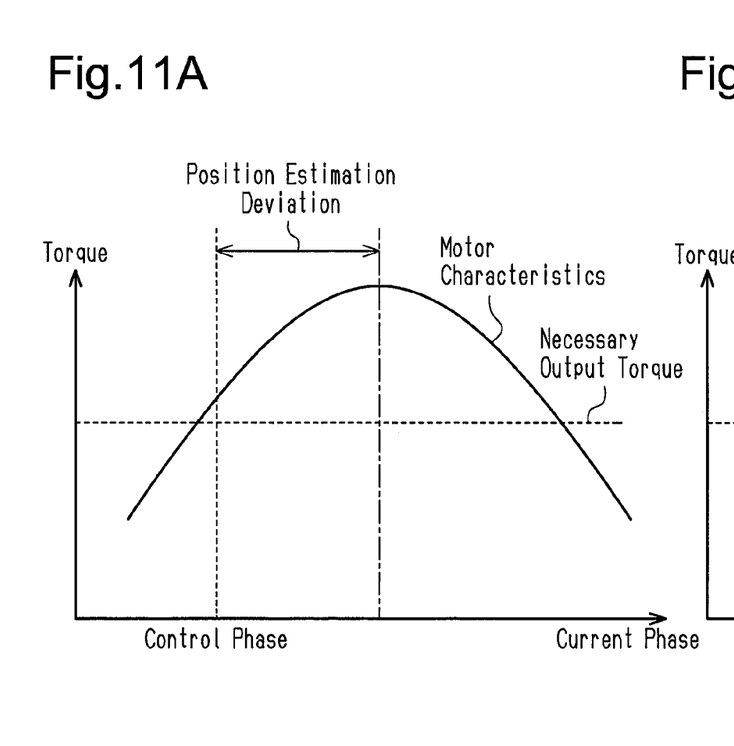
FIG. 11A is a graph of the characteristics and the necessary output torque of the motor to illustrate the problem to be solved.

In the production of the magnets of interior permanent magnet motors, variation occurs in the amount of the magnetic fluxes of the magnets. Because of the influence of magnetic saturation, the inductance of the motor decreases in proportion to the amount of the magnetic fluxes of the magnets. Thus, variation in the amount of the magnetic fluxes of the magnets results in the following problem. That is, when position sensorless control is used to estimate the rotation angle of the rotor from a motor current and an inverter output voltage (motor applied voltage), the estimated position of the rotor is inaccurate due to the inductance. More specifically, as shown in FIG. 11A of the present application, when the control phase in the rotation of the rotor is deviated with respect to the maximum torque phase of the motor, the output torque of the motor decreases. A torque margin is needed to compensate for the decrease in the torque. This enlarges the motor. The above-described configuration solves such a problem.

Example 2

In the onboard fluid machine according to example 1, the rotation angle estimation unit is configured to estimate an angle of the rotor from a U-phase current, a V-phase current, and a W-phase current that flow into the motor when the pulse voltage is applied. In this configuration, the U-phase current, the V-phase current, and the W-phase current, which are needed to obtain the d-axis current and the q-axis current, are used to estimate the rotation angle of the rotor. Thus, when a pulse voltage is applied once, the saliency ratio and the rotation angle can both be estimated. The motor can be quickly reactivated by performing an advanced estimation of the rotation angle of the rotor when in a stopped state.

Example 3

In the onboard fluid machine according to example 1 or 2, the correction unit is configured to correct a power voltage detection value of the inverter circuit serving as the parameter for the control.

Example 4

In the onboard fluid machine according to example 1 or 2, the correction unit is configured to correct the d-axis voltage command value and the q-axis voltage command value, which serve as the parameter for the control.

Example 5

In the onboard fluid machine according to example 1 or 2, the correction unit is configured to correct a d-axis inductance and a q-axis inductance that serve as the parameter for the control.

Example 6

A control method for controlling an onboard fluid machine is provided. The onboard fluid machine includes an inverter device and a motor. The control method includes supplying, by an inverter circuit having a switching element, the motor with alternating-current power, calculating, by a current controller of the inverter device, a d-axis voltage command value and a q-axis voltage command value, calculating, by a rotation angle estimation unit, a rotation angle of a rotor of the motor from a d-axis current and a q-axis current that flow into the motor and from the d-axis voltage command value and the q-axis voltage command value, applying, by a correction unit of the inverter device, a pulse voltage to the motor when the motor is in a stopped state, comparing, by the correction unit, the d-axis current and the q-axis current, which flow into the motor when the pulse voltage is applied, and correcting, by the correction unit, a parameter for control of the motor in accordance with a result of the comparison.

Example 7

A non-transitory computer-readable storage medium that stores a program causing a processor to execute a control process for controlling an onboard fluid machine is provided. The control process includes supplying, by an inverter circuit having a switching element, the motor with alternating-current power, calculating, by a current controller of the inverter device, a d-axis voltage command value and a q-axis voltage command value, calculating, by a rotation angle estimation unit, a rotation angle of a rotor of the motor from a d-axis current and a q-axis current that flow into the motor and from the d-axis voltage command value and the q-axis voltage command value, applying, by a correction unit of the inverter device, a pulse voltage to the motor when the motor is in a stopped state, comparing, by the correction unit, the d-axis current and the q-axis current, which flow into the motor when the pulse voltage is applied, and correcting, by the correction unit, a parameter for control of the motor in accordance with a result of the comparison.

According to the present disclosure, it is capable of reducing the size of a motor.

Other aspects and advantages of the present disclosure will become apparent from the following description, taken in conjunction with the accompanying drawings, illustrating by way of example the principles of the disclosure.

BRIEF DESCRIPTION OF THE DRAWINGS

The disclosure, together with objects and advantages thereof, may best be understood by reference to the following description of the presently preferable embodiments together with the accompanying drawings in which.

DETAILED DESCRIPTION

First Embodiment

An onboard motor-driven compressor 20 according to a first embodiment of the present disclosure will now be described with reference to FIGS. 1 to 6, 11A, and 11B.

The onboard motor-driven compressor 20 of the present embodiment is used for, for example, a vehicle air conditioner. That is, the fluid to be compressed by the onboard motor-driven compressor of the present embodiment is refrigerant.

Figure 1:
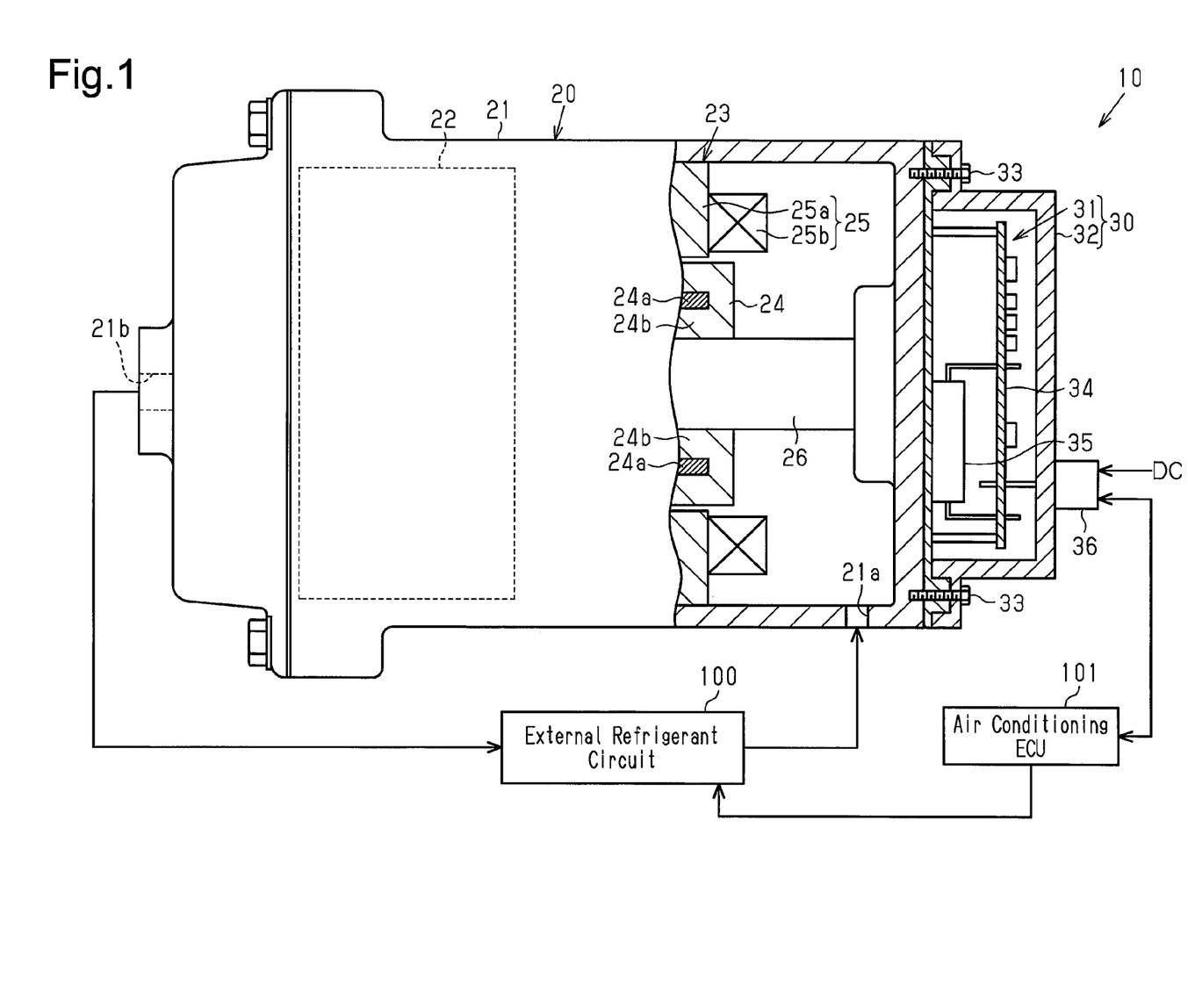
FIG. 1 is a partially cutaway view schematically showing an onboard motor-driven compressor.

As shown in FIG. 1, an onboard air conditioner 10 includes the onboard motor-driven compressor 20 and an external refrigerant circuit 100 that supplies the onboard motor-driven compressor 20 with refrigerant. The external refrigerant circuit 100 includes, for example, a heat exchanger and an expansion valve. The onboard motor-driven compressor 20 compresses refrigerant and the external refrigerant circuit 100 performs heat exchange of the refrigerant and expands the refrigerant. This allows the onboard air conditioner 10 to cool and warm the interior of the vehicle.

The onboard motor-driven compressor 20 includes an air conditioning ECU 101 that controls the entire onboard air conditioner 10. The air conditioning ECU 101 is configured to obtain, for example, the temperature of the passenger compartment and a preset temperature. Based on the information, the air conditioning ECU 101 transmits various commands such as an on-off command to the onboard motor-driven compressor 20.

The onboard motor-driven compressor 20 includes a housing 21 having a suction port 21a into which refrigerant is drawn in from the external refrigerant circuit 100. The onboard motor-driven compressor 20 also includes a compression unit 22 and a three-phase motor 23 that are accommodated in the housing 21.

The entire housing 21 is substantially cylindrical. The housing 21 has a discharge port 21b out of which refrigerant is discharged.

The compression unit 22 causes refrigerant that has been drawn into the housing 21 from the suction port 21a to be compressed and the compressed refrigerant to be discharged out of the discharge port 21b. The specific structure of the compression unit 22 may be of any type such as a scroll type, a piston type, or a vane type.

The three-phase motor 23 drives the compression unit 22. An interior permanent magnet motor (IPM motor) is used for the three-phase motor 23. The three-phase motor 23 includes, for example, a cylindrical rotation shaft 26 supported to be rotatable relative to the housing 21, a cylindrical rotor 24 fixed to the rotation shaft 26, and a stator 25 fixed to the housing 21. The rotor 24 includes a cylindrical rotor core 24b in which magnets 24a are embedded. The magnets 24a are permanent magnets. The axial direction of the rotation shaft 26 coincides with the axial direction of the housing 21, which is cylindrical. The stator 25 includes a cylindrical stator core 25a and coils 25b wound around the teeth of the stator core 25a. The rotor 24 is opposed to the stator 25 in the radial direction of the rotation shaft 26.

The onboard motor-driven compressor 20 includes an inverter unit 30. The inverter unit 30 includes a motor-driving inverter device 31 that drives the three-phase motor 23 and a case 32 that accommodates the motor-driving inverter device 31. The coils 25b of the three-phase motor 23 are electrically connected to the motor-driving inverter device 31. The case 32 is fixed to the housing 21 by bolts 33 serving as fasteners. That is, the motor-driving inverter device 31 is integrated with the onboard motor-driven compressor 20 of the present embodiment.

The motor-driving inverter device 31 includes a circuit board 34 and a power module 35 that is electrically connected to the circuit board 34. Various electronic components are mounted on the circuit board 34. A connector 36 is arranged on the outer surface of the case 32. The circuit board 34 is electrically connected to the connector 36. The connector 36 supplies the motor-driving inverter device 31 with power and electrically connects the air conditioning ECU 101 to the motor-driving inverter device 31.

In this manner, the onboard motor-driven compressor 20 includes the compression unit 22, which is arranged in the housing 21, and the three-phase motor 23, which is arranged in the housing 21 and drives the compression unit 22, and the onboard motor-driven compressor 20 is integrated with the motor-driving inverter device 31, which supplies the three-phase motor 23 with power.

Figure 2:
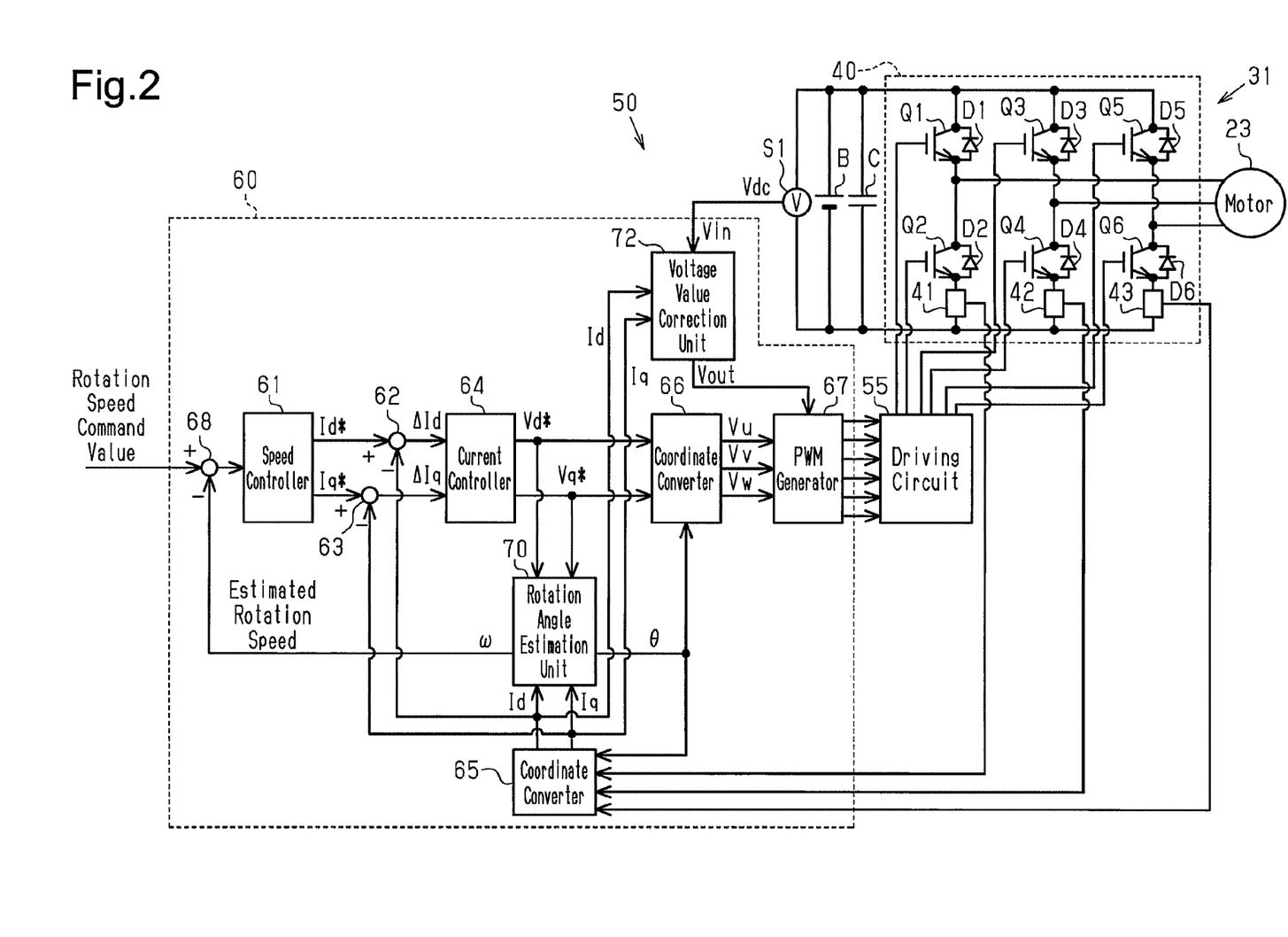
FIG. 2 is a diagram illustrating the configuration of a motor-driving inverter device in a first embodiment.

As shown in FIG. 2, the motor-driving inverter device 31 includes an inverter circuit 40 and an inverter controller 50. The inverter controller 50 includes a driving circuit 55 and a PWM controller 60.

The inverter circuit 40 includes six switching elements Q1 to Q6 and six diodes D1 to D6. An IGBT is used for each of the switching elements Q1 to Q6. The switching element Q1 configuring a U-phase upper arm and the switching element Q2 configuring a U-phase lower arm are connected in series between a positive electrode bus bar and a negative electrode bus bar. The switching element Q3 configuring a V-phase upper arm and the switching element Q4 configuring a V-phase lower arm are connected in series between the positive electrode bus bar and the negative electrode bus bar. The switching element Q5 configuring a W-phase upper arm and the switching element Q6 configuring a W-phase lower arm are connected in series between the positive electrode bus bar and the negative electrode bus bar. The diodes D1 to D6 are connected in antiparallel to the switching elements Q1 to Q6, respectively. A battery B serving as a direct-current power supply is connected to the positive electrode bus bar and the negative electrode bus bar via a smoothing capacitor C.

A U-phase terminal of the three-phase motor 23 (hereinafter referred to as the motor 23) is connected to a connection portion between the switching element Q1 and the switching element Q2. A V-phase terminal of the motor 23 is connected to a connection portion between the switching element Q3 and the switching element Q4. A W-phase terminal of the motor 23 is connected to a connection portion between the switching element Q5 and the switching element Q6. When the switching elements Q1 to Q6 perform switching operations, the inverter circuit 40 including the switching elements Q1 to Q6 that configure the upper and lower arms converts a direct-current voltage, which is the voltage at the battery B, into alternating-current voltage and supplies the alternating-current voltage to the motor 13. That is, the inverter circuit 40 includes the switching elements Q1 to Q6 and supplies the motor 23 with alternating-current power.

The driving circuit 55 is connected to all the gate terminals of the switching elements Q1 to Q6. The driving circuit 55 performs switching operations with the switching elements Q1 to Q6 based on control signals.

A current sensor 41 is connected between the emitter of the switching element Q2 and the negative electrode bus bar. A current sensor 42 is connected between the emitter of the switching element Q4 and the negative electrode bus bar. A current sensor 43 is connected between the emitter of the switching element Q6 and the negative electrode bus bar. A voltage sensor S1 detects the voltages (battery voltages) at the two ends of the battery B, i.e., the power voltage as a direct-current voltage.

In the present embodiment, a rotation angle sensor is not used. Instead, the number of position sensors is reduced. A rotation angle estimation unit 70 (described later) calculates the rotation angle θ (rotation position) of the rotor 24 from a d-axis current Id and a q-axis current Iq, which flow into the motor 23, and from a d-axis voltage command value Vd* and a q-axis voltage command value Vq*.

The PWM controller 60 includes a speed controller 61, subtraction units 62, 63, and 68, a current controller 64, coordinate converters 65 and 66, a PWM generator 67, the rotation angle estimation unit 70, and a voltage value correction unit 72 serving as a correction unit.

The coordinate converter 65 converts the U-phase current Iu, the V-phase current Iv, and the W-phase current Iw into the d-axis current Id (exciting component current) and the q-axis current Iq (torque component current) based on the U-phase current Iu, the V-phase current Iv, and the W-phase current Iw, which are respectively calculated by the current sensors 41, 42, and 43 and flow into the motor 23, and based on the estimated rotation angle θ (estimated rotation position) of the rotor 24, which is calculated by the rotation angle estimation unit 70. In the current flowing into the motor 23, the d-axis current Id (exciting component current) is a current vector component in the same direction as magnetic fluxes generated by the magnets 24a, and the q-axis current Iq (torque component current) is a current vector component orthogonal to the d-axis.

The subtraction unit 68 calculates the difference between a rotation speed command value, which is input from the outside, and an estimated rotation speed. The estimated rotation speed is obtained by using the rotation angle estimation unit 70 to differentiate the estimated angle (θ) that is to be calculated.

Based on the difference between the rotation speed command value, which is input from the outside, and the estimated rotation speed, the speed controller 61 calculates a d-axis current command value Id* related to the d-axis current Id and a q-axis current command value Iq* related to the q-axis current Iq.

The subtraction unit 62 calculates a difference ΔId between the d-axis current command value Id* and the d-axis current Id. The subtraction unit 63 calculates a difference ΔIq between the q-axis current command value Iq* and the q-axis current Iq. The current controller 64 calculates the d-axis voltage command value Vd* and the q-axis voltage command value Vq* based on the difference ΔIq and the difference ΔIq. The coordinate converter 66 converts the d-axis voltage command value Vd* and the q-axis voltage command value Vq* into voltage command values Vu, Vv, and Vw, which are voltages applied to the motor 23, based on the estimated rotation angle θ (estimated rotation position) of the rotor 24, which is calculated by the rotation angle estimation unit 70.

The PWM generator 67 normalizes the voltage command values Vu, Vv, and Vw with a power voltage value (Vdc) of the inverter circuit 40 and outputs a PWM control signal based on the comparison result of the normalized voltage command value with a triangle wave. The PWM control signal is a control signal for turning on and off the switching elements Q1 to Q6 of the inverter circuit 40.

More specifically, the PWM controller 60 uses the U-phase current Iu, the V-phase current Iv, and the W-phase current Iw, which flow into the motor 23, to control the switching elements Q1 to Q6, which are arranged on the current path of the motor 23, so that the d-axis current (exciting component current) and the q-axis current (torque component current) of the motor 23 reach target values. Signals from the PWM generator 67 are transmitted to the driving circuit 55.

The rotation angle estimation unit 70 calculates (estimates) the estimated rotation angle θ and an angular velocity ω of the motor 23 based on the d-axis current Id, the q-axis current Iq, the d-axis voltage command value Vd*, and the q-axis voltage command value Vq*.

The voltage value correction unit 72 inputs a direct-current voltage detection value, which is obtained by the voltage sensor S1, as an input value Vin. Then, the voltage value correction unit 72 corrects a power voltage Vdc of the inverter circuit 40 and outputs the power voltage Vdc as the output value Vout. The corrected direct-current voltage (Vout) is transmitted to the PWM generator 67. The PWM generator 67 normalizes the voltage command values Vu, Vv, and Vw to calculate a PWM control signal based on the comparison result of the normalized voltage command values and the triangle wave.

Figure 3:
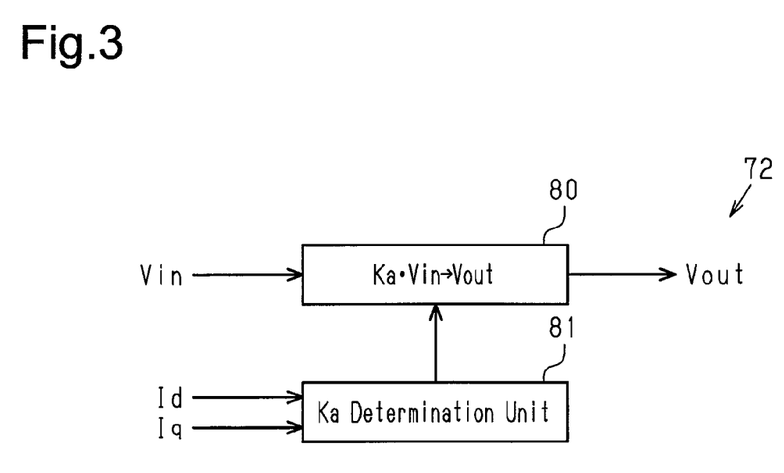
FIG. 3 is a diagram illustrating the configuration of a voltage value correction unit in the inverter device shown in FIG. 2.

FIG. 3 illustrates the configuration of the voltage value correction unit 72.

Figure 4:
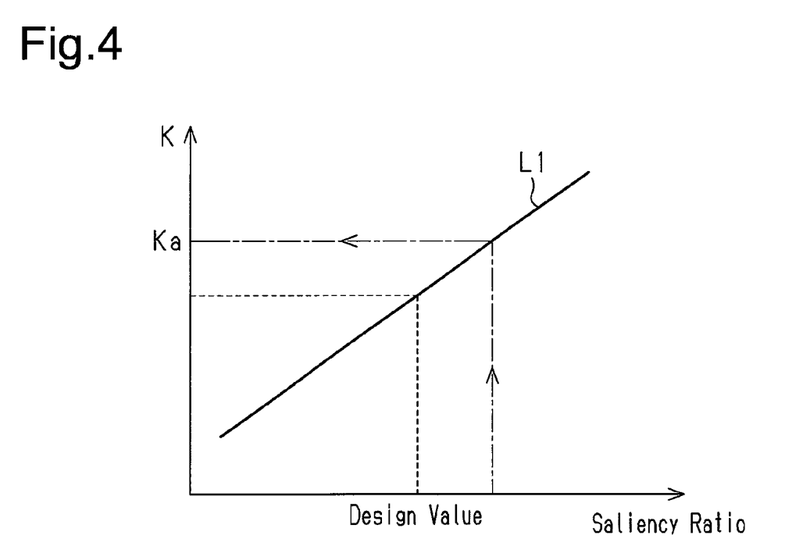
FIG. 4 is a graph illustrating a map in the voltage value correction unit shown in FIG. 3.

The voltage value correction unit 72 includes a multiplication unit 80 and a correction coefficient determination unit 81. The multiplication unit 80 inputs a direct-current voltage (input value Vin) to multiply the direct-current voltage Vin by a correction coefficient Ka. That is, the multiplication unit 80 outputs Ka×Vin as the corrected direct-current voltage (output value Vout). The correction coefficient determination unit 81 calculates the correction coefficient Ka using a map shown in FIG. 4. In FIG. 4, the horizontal axis indicates a saliency ratio, the vertical axis indicates the correction coefficient Ka (K value), and a characteristic line L1 is defined. The characteristic line L1 is defined such that the larger the saliency ratio, the larger the correction coefficient Ka becomes. The correction coefficient determination unit 81 shown in FIG. 3 estimates a saliency ratio Lq/Ld, which is the ratio of a d-axis inductance Ld to a q-axis inductance Lq, from the comparison result of the d-axis current Id and the q-axis current Iq. Then, the correction coefficient determination unit 81 calculates the correction coefficient Ka from the estimated saliency ratio using the map shown in FIG. 4. Using the correction coefficient Ka calculated in this manner, the multiplication unit 80 calculates Ka×Vin as the corrected direct-current voltage (output value Vout).

The operation of the onboard motor-driven compressor 20 of the present embodiment will now be described.

When the motor 23 is in a stopped state, the correction coefficient determination unit 81 estimates the saliency ratio (Lq/Ld) of the motor 23 from the comparison result of the d-axis current Id and the q-axis current Iq and calculates the correction coefficient Ka from the estimated saliency ratio using the map shown in FIG. 4. The correction coefficient Ka is determined as an optimal value, i.e., as a maximum torque phase correction coefficient Ka. Subsequently, the correction coefficient Ka determined in this manner is used to control the motor 23.

The process of calculating the correction coefficient Ka when the motor 23 is in a stopped state, i.e., the process of determining a gain (correction coefficient Ka) used by the multiplication unit 80, will now be described in detail with reference to FIGS. 5 and 6.

Figure 5:
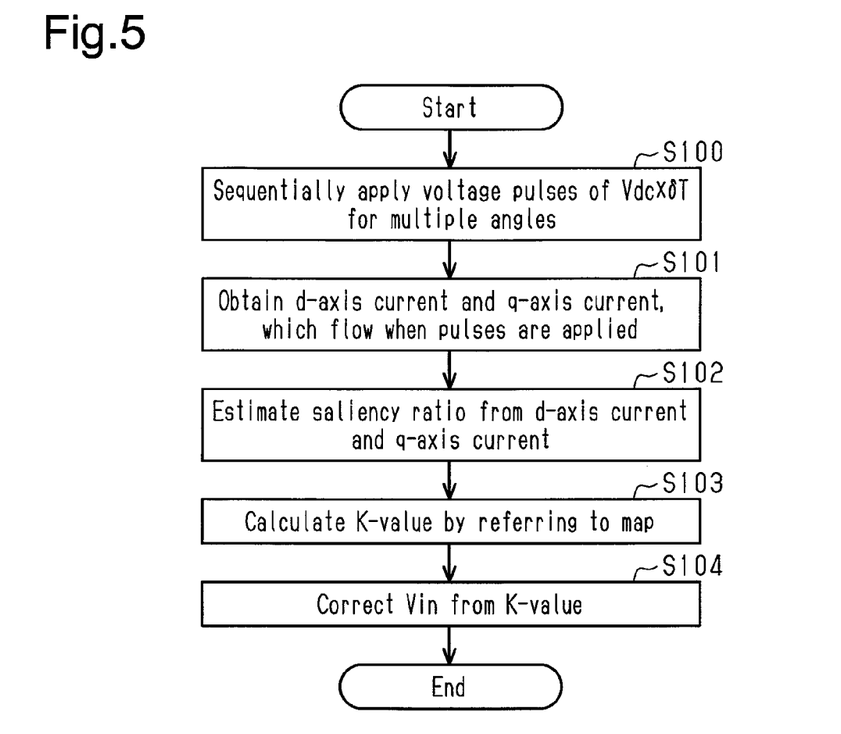
FIG. 5 is a flowchart illustrating the operation of the voltage value correction unit shown in FIG. 3.
Figure 6:
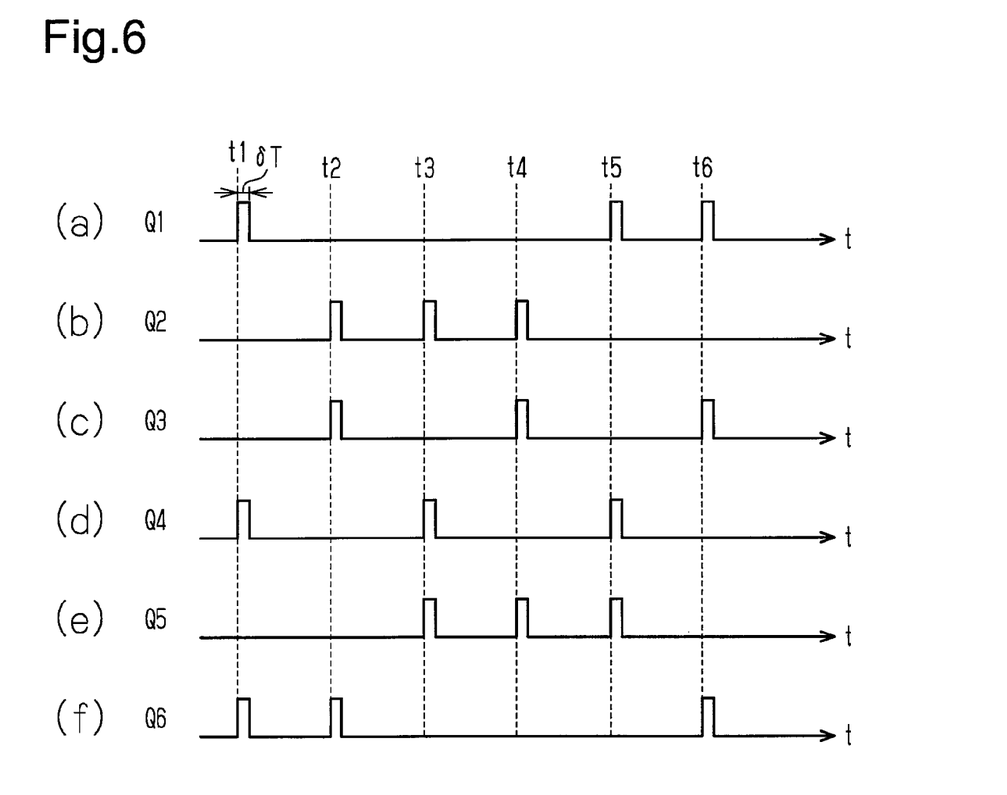
FIG. 6 is a timing diagram including sections (a) to (f), which illustrate the operation of the voltage value correction unit shown in FIG. 3.

As shown in FIG. 5, in step S100, the correction coefficient determination unit 81 sequentially applies, for multiple angles, multiple voltage pulses in which Vdc×δT is the same to the motor 23. More specifically, the correction coefficient determination unit 81 turns on the U-phase upper switching element Q1 shown in FIG. 6A, the U-phase lower switching element Q2 shown in FIG. 6B, the V-phase upper switching element Q3 shown in FIG. 6C, the V-phase lower switching element Q4 shown in FIG. 6D, the W-phase upper switching element Q5 shown in FIG. 6E, and the W-phase lower switching element Q6 shown in FIG. 6F for predetermined switching patterns at predetermined points in time t1, t2, t3, t4, t5, and t6 by a micro time δT. The correction coefficient determination unit 81 determines the micro-time δT each time switching is performed such that the voltage pulses have the same area (Vdc×δT) even when the power voltage Vdc changes. For example, the correction coefficient determination unit 81 determines the micro-time 5T within a range less than 100 μsec of one cycle of a carrier signal, which is a control cycle. In this manner, current is supplied to the motor 23 by applying voltage between the positive electrode bus bar and the negative electrode bus bar in the U-phase, the V-phase, and the W-phase.

In step S101 shown in FIG. 5, the correction coefficient determination unit 81 obtains the d-axis current Id and the q-axis current Iq by converting the U-phase current, the V-phase current, and the W-phase current, which are supplied when pulses are applied, into a d-q axis coordinate. In step S102, the correction coefficient determination unit 81 estimates the saliency ratio from the comparison result of the d-axis current Id and the q-axis current Iq. More specifically, the saliency ratio is estimated from the total sum $\Sigma|Id|$ of the absolute values of the d-axis current and the total sum $\Sigma|Iq|$ of the absolute values of the q-axis current, which are obtained from the switching patterns, using the saliency ratio estimation equation ($\Sigma|Id|/\Sigma|Iq|$). Alternatively, the saliency ratio is estimated from the square sum $\Sigma Id^2$ of the d-axis current and the square sum $\Sigma Iq^2$ of the q-axis current, which are obtained from the switching patterns, using the saliency ratio estimation equation ($\Sigma Id^2/\Sigma Iq^2$). For example, regarding the switching patterns shown in FIG. 6, a phase current is obtained for each switching pattern. The phase currents are all converted into the d-axis current and the q-axis current and then substituted into the above-described saliency ratio estimation equation to estimate the saliency ratio. In step S103, the correction coefficient determination unit 81 calculates the K value (correction coefficient Ka) by referring to the map shown in FIG. 4. That is, the correction coefficient determination unit 81 calculates the deviation amount of the saliency ratio from a design value by comparing the estimated saliency ratio with the saliency ratio of the design value.

In step S104, the multiplication unit 80 corrects the input value Vin from the K value when the motor 23 is running. In other words, the multiplication unit 80 corrects the direct-current voltage (input value Vin), which is a control parameter, based on the deviation amount of the saliency ratio from the design value. That is, when the motor 23 is in a stopped state, the voltage value correction unit 72 corrects the power voltage detection value of the inverter, which serves as a parameter for control, i.e., the direct-current voltage detection value (Vin) obtained by the voltage sensor S1, in accordance with the comparison result of the d-axis current Id and the q-axis current Iq, which flow into the motor 23 when pulse voltages are applied to the motor 23.

Thus, decreases in the output torque that result from deviation of the control phase can be resolved. Accordingly, the torque margin of the motor 23 can be reduced, thereby reducing the motor 23 in size and cost.

Description will now be made with regard to FIGS. 11A and 11B.

The case in which the adjustment described in the present embodiment is not performed will now be described with reference to FIG. 11A. If the estimated angle is correct in the relationship between the characteristics and the current phases of the motor 23, the control phase can reach the peak of the characteristics of the motor 23. However, when the estimation of the rotor rotation position is inaccurate, the control phase cannot reach the peak of the characteristics of the motor 23, i.e., the maximum torque phase (current phase serving as torque peak), and is deviated toward the left and right in FIG. 11A from the maximum torque phase. The manner of deviation of the control phase varies depending on the tolerance of the magnets of the motor 23 or the hardware of the inverter.

Figure 11B:
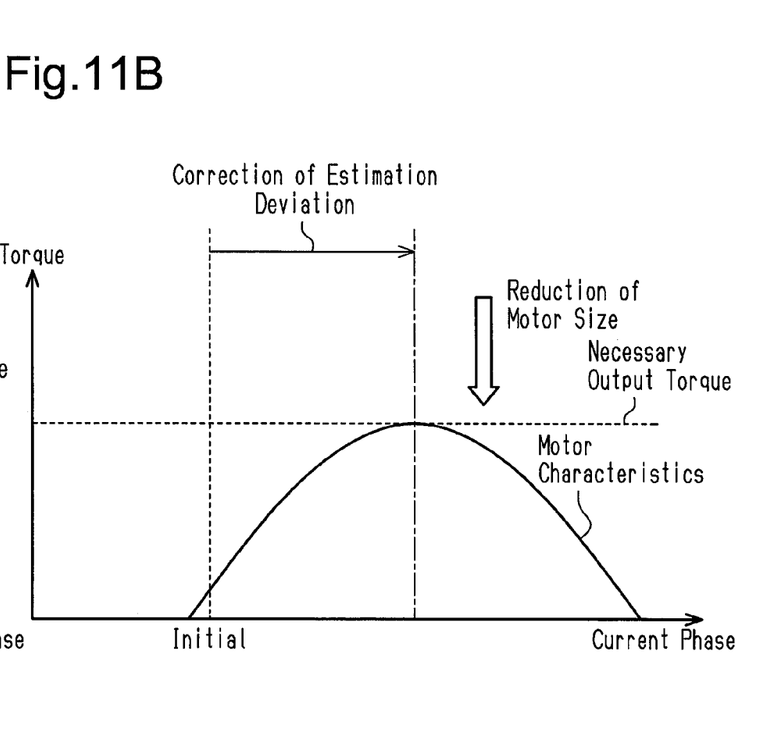
FIG. 11B is a graph of the characteristics and the necessary output torque of the motor to illustrate the first embodiment.

The adjustment performed in the present embodiment is shown in FIG. 11B. In the state of the magnetic fluxes of initial magnets 24a, deviation occurs in the estimated value of the rotor rotation position. Although it is unknown what kind of variation occurs in the magnetic fluxes of the initial magnets 24a, the adjustment in the present embodiment allows the optimal point of the current phases, which becomes the torque peak, to be understood. The peak position of the torque can be shifted to the optimal point by deviating the control parameter. That is, when auto-tuning is performed from the initial current phase, the estimation deviation from the maximum torque phase (current phase serving as torque peak) can be corrected.

In addition, if the rotation angle θ of the motor 23 is calculated based on the U-phase current Iu, the V-phase current Iv, the W-phase current Iw, and the direct-current voltage without using the voltage value correction unit 72, the relationship between the characteristics of the motor 23 and the necessary output torque becomes the one shown in FIG. 11A. In FIG. 11A, whereas the characteristics of the motor 23 indicate the peak value, the necessary output torque is a fixed value. When the control phase is deviated from the peak value (maximum torque phase) of the characteristics of the motor 23, a motor 23 with a larger output needs to be used to ensure the necessary output torque.

Referring to FIG. 11B, in the present embodiment, the voltage value correction unit 72 is used to correct the deviation between the initial current phase and the peak value of the characteristics of the motor 23. This allows the control phase to match the peak value of the characteristics of the motor 23. Thus, a motor with a smaller output can be used as the motor 23, which can ensure the necessary output torque.

The description of the present embodiment can be summarized as follows.

Motor control includes position sensorless control. In the position sensorless control, the obtained input voltage and the current of the motor 23 are used to estimate the rotation angle of the rotor 24 through calculation. The output maximum torque of the motor 23 can be obtained by tuning the parameters so as to operate the motor 23 at the maximum torque based on the estimated position of the motor 23. When variation occurs in the motor 23 (for example, when variation occurs in the magnetic fluxes of the permanent magnets 24a), the characteristics of the motor 23 change. Since the position sensorless control is affected by changes in the characteristics of the motor 23, errors may occur in the estimated position of the motor 23. In this case, the output maximum torque may not be able to be produced.

In the present embodiment, decreases in the output torque that result from variation in the motor 23 can be overcome.

More specifically, in the present embodiment, when the motor 23 is in a stopped state, the saliency ratio (Lq/Ld) of the motor 23 is estimated to compare the estimated saliency ratio with the saliency ratio of the design value of the motor 23. The parameters used to control the motor 23 are corrected in accordance with the deviation amount of the design value of the estimated saliency ratio calculated through the comparison. In order to estimate the saliency ratio in this manner, when the motor 23 is in a stopped state, voltage pulses in an extremely short time, for example, voltage pulses for multiple angles in one cycle of a carrier signal, which is a control cycle, are applied to the motor 23 to estimate the saliency ratio from the d-axis current and the q-axis current, which have flowed to the motor 23. The estimation of the saliency ratio is to indirectly detect the amount of magnetic fluxes of the magnets 24a of the rotor 24, utilizing the changes in inductance of the motor 23 in accordance with the changes in the magnetic fluxes of the magnets 24a. The maps of control parameters that are to be corrected in advance are maintained in the software, and the deviation amount of the detected saliency ratio from the saliency ratio of the design value is calculated. In accordance with the maps, the correction amount (Ka) of the control parameters is determined. In this manner, decreases in the maximum output torque that result from variation in the motor 23 are reduced. Further, elimination of the torque margin reduces the motor 23 in size and weight.

The above-described embodiment has the advantages described below.

(1) The onboard motor-driven compressor 20, which serves as an onboard fluid machine, includes the inverter device 31. The inverter device 31 includes the inverter circuit 40, the current controller 64, and the rotation angle estimation unit 70. The inverter circuit 40 includes the switching elements Q1 to Q6 and supplies the motor 23 with alternating-current power. The current controller 64 calculates the d-axis voltage command value Vd* and the q-axis voltage command value Vq*. The rotation angle estimation unit 70 calculates the rotation angle θ of the rotor 24 from the d-axis current Id and the q-axis current Iq, which flow into the motor 23, and from the d-axis voltage command value Vd* and the q-axis voltage command value Vq*. The inverter device 31 further includes the voltage value correction unit 72. When the motor 23 is in a stopped state, the voltage value correction unit 72 applies pulse voltages to the motor 23 and corrects the parameter for control of the motor 23 in accordance with the comparison result of the d-axis current Id and the q-axis current Iq, which flow into the motor 23 when the application is performed.

More specifically, the voltage value correction unit 72 corrects the power voltage detection value of the inverter circuit 40, which serves as the parameter for the control, i.e., the direct-current voltage detection value (Vin) obtained by the voltage sensor S1, in accordance with the comparison result of the d-axis current Id and the q-axis current Iq, which flow into the motor 23 through the application of the pulse voltages to the motor 23 when the motor 23 is in a stopped state.

In this manner, in the present embodiment, when the motor 23 is in a stopped state, the correction amount (K) is determined to limit deviation of the control phase in the rotation of the rotor 24 from the maximum torque phase. This limits decreases in the output torque and thus sets the torque margin to be small, thereby reducing the size of the motor 23. Particularly, in the present embodiment, the parameter for the control is the power voltage detection value of the inverter circuit 40. Correcting the power voltage detection value of the inverter, i.e., the direct-current voltage detection value (Vin) obtained by the voltage sensor S1, allows the motor 23 to run stably.

Thus, in the present embodiment, when the motor 23 is in a stopped state, pulse voltages are applied to the motor 23, and the saliency ratio (q-axis inductance/d-axis inductance) is estimated in accordance with the comparison result of the d-axis current and the q-axis current, which flow into the motor 23 when the application is performed. This indirectly detects the inductance of the motor 23 and corrects the parameter for the control of the motor 23 based on the estimated saliency ratio. Thus, the steady-state errors between the control phase and the maximum torque phase in the rotation of the rotor 24 are reduced. This limits decreases in the output torque, sets the torque margin to be small, and reduces the size of the motor 23. The above-described saliency ratio estimation is to indirectly detect the inductance of the motor 23. The estimation of the saliency ratio involves the use of larger changes in the q-axis inductance than in the d-axis inductance in accordance with the changes in the amount of the magnetic fluxes of the magnets. Additionally, in the present embodiment, the comparison result of the d-axis current and the q-axis current is used to correct the parameter for the control of the motor 23. This allows errors in the gain of the current sensors to be cancelled. As a result, correction values can be calculated more accurately.

(2) The rotation angle estimation unit 70 estimates the angle of the rotor 24 from the U-phase current, the V-phase current, and the W-phase current, which flow into the motor 23 when pulse voltages are applied. That is, the U-phase current, the V-phase current, and the W-phase current, which are needed to obtain the d-axis current and the q-axis current, are used to estimate the rotation angle of the rotor 24. Thus, when pulse voltages are applied once, the saliency ratio and the rotation angle can both be estimated. The motor 23 can be quickly reactivated by performing an advanced estimation of the rotation angle of the rotor 24 when in a stopped state.

Second Embodiment

A second embodiment of the present disclosure will now be described with reference to FIGS. 7 to 8B, focusing on the difference from the first embodiment.

Figure 7:
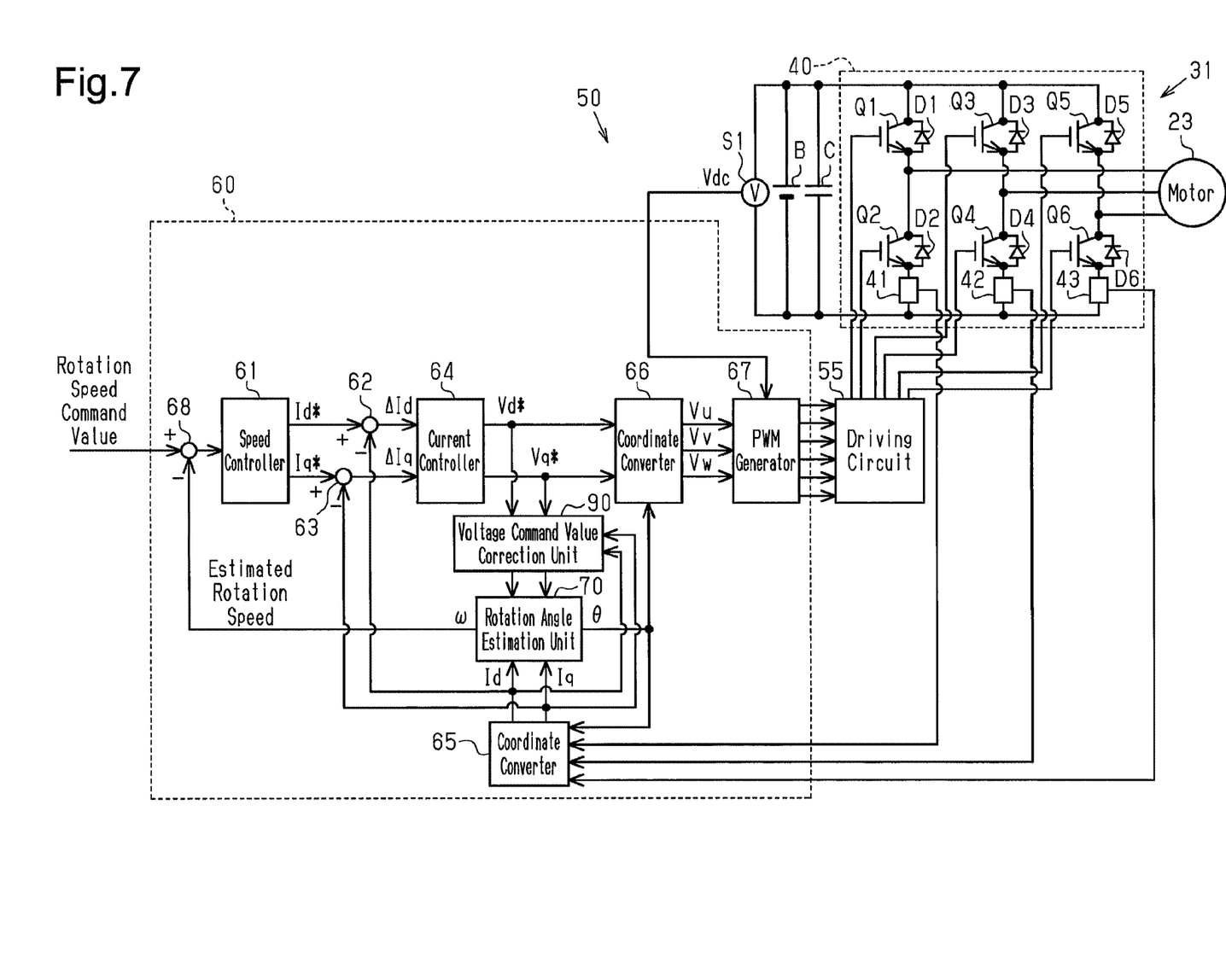
FIG. 7 is a diagram illustrating the configuration of a motor-driving inverter device in a second embodiment of the present disclosure.

The inverter device 31 of the onboard motor-driven compressor 20 of the second embodiment has the configuration shown in FIG. 7 instead of FIG. 2. In FIG. 7, the inverter device 31 includes a voltage command value correction unit 90 serving as a correction unit. The voltage command value correction unit 90 inputs the d-axis voltage command value Vd* and the q-axis voltage command value Vq* from the current controller 64. Then, the voltage command value correction unit 90 corrects Vd* and Vq* to output them to the rotation angle estimation unit 70.

Figure 8A:
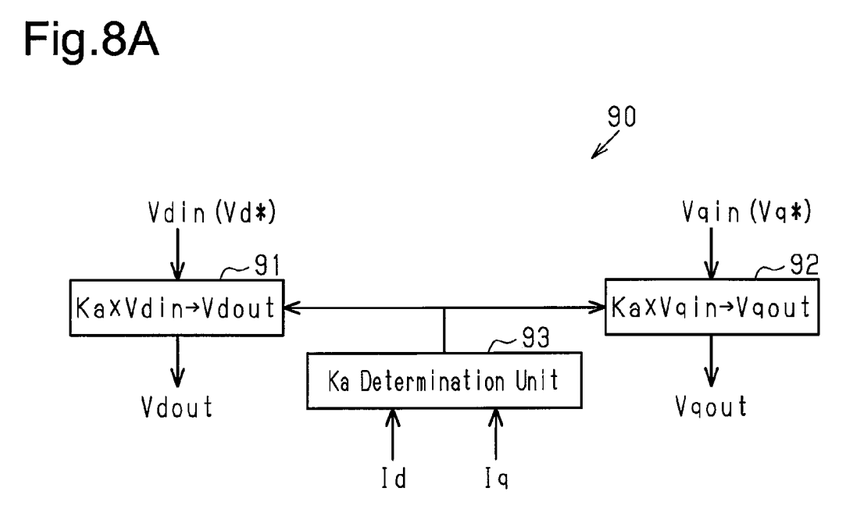
FIG. 8A is a diagram illustrating the configuration of a voltage command value correction unit in the inverter device shown in FIG. 7.
Figure 8B:
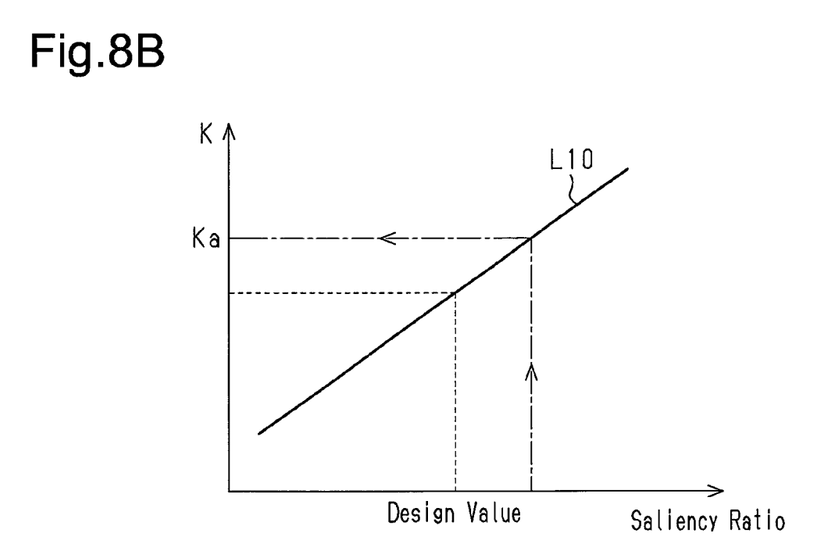
FIG. 8B is a graph illustrating a map in the inverter device shown in FIG. 8A.

As shown in FIG. 8A, the voltage command value correction unit 90 includes multiplication units 91 and 92 and a correction coefficient determination unit 93. The multiplication unit 91 inputs the d-axis voltage command value Vd* (input value Vdin) to multiply the d-axis voltage command value Vd* by the correction coefficient Ka. That is, the multiplication unit 91 outputs Ka×Vdin as the corrected d-axis voltage command value Vd* (output value Vdout). The multiplication unit 92 inputs the q-axis voltage command value Vq* (input value Vqin) to multiply the q-axis voltage command value Vq* by the correction coefficient Ka. That is, the multiplication unit 92 outputs Ka×Vqin as the corrected q-axis voltage command value Vq* (output value Vqout). The correction coefficient determination unit 93 uses a map shown in FIG. 8B to calculate the correction coefficient Ka. In FIG. 8B, the horizontal axis indicates a saliency ratio, the vertical axis indicates the correction coefficient Ka, and a characteristic line L10 is defined. The characteristic line L10 is defined such that the larger the saliency ratio, the larger the correction coefficient Ka becomes. The correction coefficient determination unit 93 shown in FIG. 8A estimates the saliency ratio Lq/Ld, which is the ratio of the d-axis inductance Ld to the q-axis inductance Lq, from the comparison result of the d-axis current Id and the q-axis current Iq. Then, the correction coefficient determination unit 93 calculates the correction coefficient Ka from the estimated saliency ratio using the map shown in FIG. 8B. Using the correction coefficient Ka calculated in this manner, the multiplication units 91 and 92 calculate Ka×Vdin and Ka×Vqin as the corrected voltage command values (output value Vout) to correct the d-axis voltage command value Vd* and the q-axis voltage command value Vq*.

The present embodiment has the advantages described below.

(3) In the present embodiment, the parameters for control of the motor 23 are the d-axis voltage command value Vd* and the q-axis voltage command value Vq*. When the motor 23 is in a stopped state, pulse voltages are applied to the motor 23. Additionally, in the present embodiment, the d-axis voltage command value Vd* and the q-axis voltage command value Vq*, which serve as the parameters for the control of the motor 23, are corrected in accordance with the comparison result of the d-axis current Id and the q-axis current Iq, which flow into the motor 23 when the pulse voltages are applied to the motor 23. Thus, deviation of the control phase in the rotation of the rotor 24 from the maximum torque phase is limited. This limits decreases in the output torque, sets the torque margin to be small, and reduces the size of the motor 23.

Third Embodiment

A third embodiment will now be described with reference to FIGS. 9 to 10C, focusing on the difference from the first embodiment.

Figure 9:
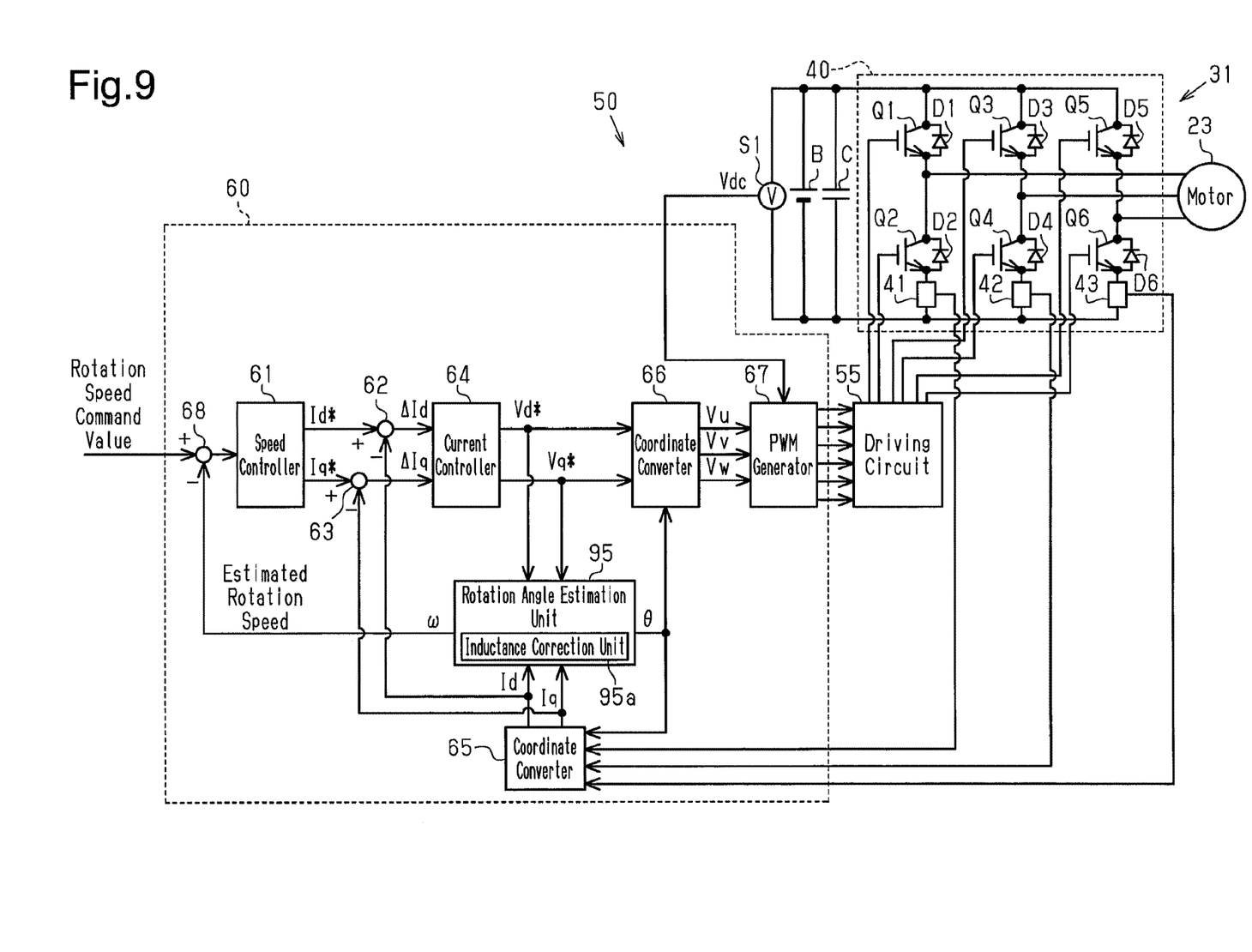
FIG. 9 is a diagram illustrating the configuration of a motor-driving inverter device in a third embodiment of the present disclosure.

The inverter device 31 of the onboard motor-driven compressor 20 of the third embodiment has the configuration shown in FIG. 9 instead of FIG. 2. In the present embodiment, a control parameter serves as an inductance.

In FIG. 9, a rotation angle estimation unit 95 of the present embodiment includes an inductance correction unit 95a serving as a correction unit. As shown in FIG. 10A, the inductance correction unit 95a includes multiplication units 96 and 97 and correction coefficient determination units 98 and 99. The multiplication unit 96 inputs a d-axis inductance Ldin to multiply Ldin by the correction coefficient Ka. That is, the multiplication unit 96 outputs Ka×Ldin as the corrected d-axis inductance Ldin (output value Ldout). The multiplication unit 97 inputs a q-axis inductance Lqin to multiply Lqin by a correction coefficient Kb. That is, the multiplication unit 97 outputs Kb×Lqin as the corrected q-axis inductance Lqin (output value Lqout). The correction coefficient determination unit 98 uses a map shown in FIG. 10B to calculate the correction coefficient Ka. In FIG. 10B, the horizontal axis indicates a saliency ratio, the vertical axis indicates the correction coefficient Ka, and a characteristic line L20 is defined. The characteristic line L20 is defined such that the larger the saliency ratio, the larger the correction coefficient Ka becomes. The correction coefficient determination unit 99 uses a map shown in FIG. 10C to calculate the correction coefficient Kb. In FIG. 10C, the horizontal axis indicates a saliency ratio, the vertical axis indicates the correction coefficient Kb, and a characteristic line L21 is defined. The characteristic line L21 is defined such that the larger the saliency ratio, the larger the correction coefficient Kb becomes.

Figure 10A:
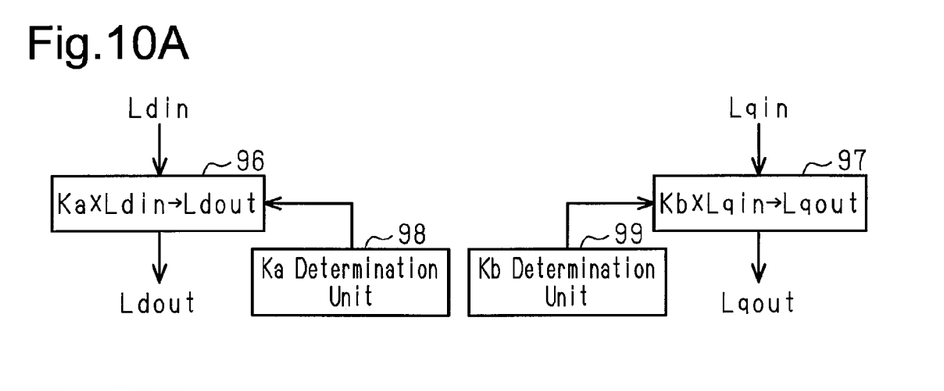
FIG. 10A is a diagram illustrating the configuration of an inductance correction unit in the inverter device shown in FIG. 9.
Figure 10B:
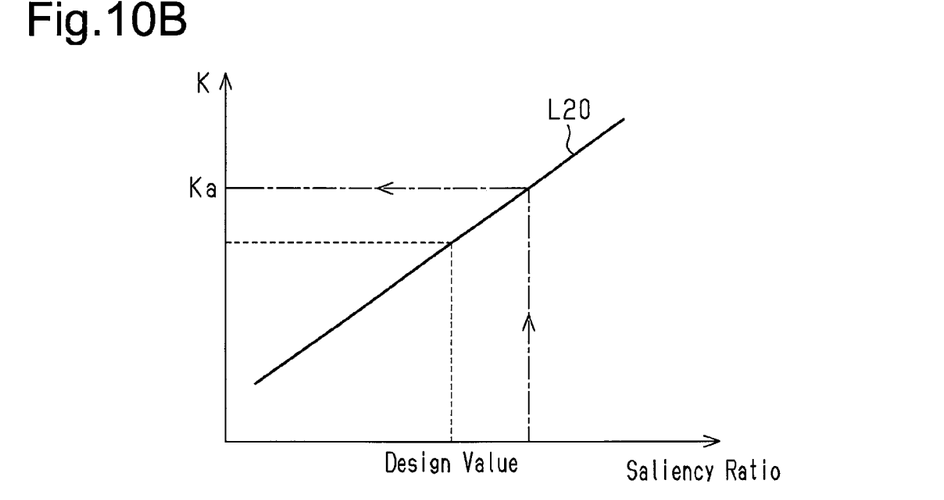
FIG. 10B is a graph illustrating a map in the inductance correction unit shown in FIG. 10A.
Figure 10C:
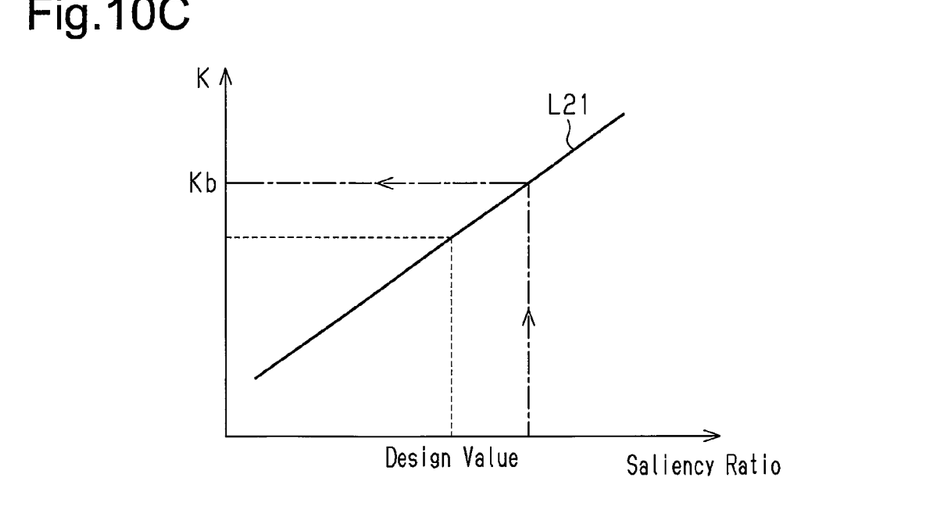
FIG. 10C is a graph illustrating a map in the inductance correction unit shown in FIG. 10A.

The correction coefficient determination units 98 and 99 shown in FIG. 10A estimate the saliency ratio Lq/Ld, which is the ratio of the d-axis inductance Ld to the q-axis inductance Lq, from the comparison result of the d-axis current Id and the q-axis current Iq. Then, the correction coefficient determination units 98 and 99 calculate the correction coefficients Ka and Kb from the estimated saliency ratio using the map shown in FIG. 10B and the map shown in FIG. 10C. Using the correction coefficients Ka and Kb calculated in this manner, the multiplication units 96 and 97 calculate Ka×Ldin and Kb×Lqin as the corrected inductance (output value Lout) to correct the d-axis inductance Ld and the q-axis inductance Lq.

The present embodiment has the advantages described below.

(4) In the present embodiment, the parameters for control of the motor 23 are the d-axis inductance Ldin and the q-axis inductance Lqin. The inductance correction unit 95a applies pulse voltages to the motor 23 when the motor 23 is in a stopped state. Additionally, the inductance correction unit 95a corrects the d-axis inductance Ldin and the q-axis inductance Lqin, which serve as the parameters of the control of the motor 23, in accordance with the comparison result of the d-axis current Id and the q-axis current Iq, which flow into the motor 23 when the pulse voltages are applied to the motor 23. Thus, deviation of the control phase in the rotation of the rotor 24 with respect to the maximum torque phase is limited. This limits decreases in the output torque, sets the torque margin to be small, and reduces the size of the motor 23.

It should be apparent to those skilled in the art that the present disclosure may be embodied in many other specific forms without departing from the spirit or scope of the disclosure. Particularly, it should be understood that the present disclosure may be embodied in the following forms.

The control parameters do not have to be voltage values or inductances. Instead, the control parameters may be, for example, current values or counter-electromotive force constants.

The relationship between the saliency ratio and the correction coefficient K does not have to be linear as shown in FIG. 4 and the like. In addition, when the saliency ratio is larger, the correction coefficient K does not have to become larger.

The saliency ratio estimation equation does not have to be the one described in the above-described embodiments. From the saliency ratio estimation equation, the result of comparing the d-axis current with the q-axis current simply needs to be obtained, and gain errors in the current sensors simply need to be cancelled.

The onboard fluid machine is applied to the onboard motor-driven compressor. Instead, the onboard fluid machine may be applied to, for example, an onboard hydrogen pump or an onboard water pump.

Each of the controllers does not have to be a device that includes an ECU or a CPU and a ROM and executes software processing. For example, at least part of the processes executed by the software in the above-described embodiments may be executed by hardware circuits dedicated to executing these processes (such as ASIC). That is, each of the controllers may be modified as long as it has any one of the following configurations (a) to (c). (a) A configuration including a processor that executes all of the above-described processes according to programs and a program storage device (non-transitory computer-readable storage medium) such as a ROM that stores the programs. (b) A configuration including a processor and a program storage device that execute part of the above-described processes according to the programs and a dedicated hardware circuit that executes the remaining processes. (c) A configuration including a dedicated hardware circuit that executes all of the above-described processes. There may be multiple software processing circuits each including a processor and a program storage device and multiple dedicated hardware circuits. That is, the above processes may be executed in any manner as long as the processes are executed by processing circuits that include at least one of a set of one or more software processing circuits and a set of one or more dedicated hardware circuits.

Therefore, the present examples and embodiments are to be considered as illustrative and not restrictive and the disclosure is not to be limited to the details given herein, but may be modified within the scope and equivalence of the appended claims.

The invention claimed is:

1. An onboard fluid machine comprising:
an inverter device; and
a motor including a rotor having a permanent magnet, wherein
the inverter device includes
an inverter circuit having a plurality of switching elements that are respectively connected to a U-phase terminal, a V-phase terminal, and a W-phase terminal of the motor, wherein the inverter circuit is configured to supply the motor with alternating-current power,
a current controller configured to calculate a d-axis voltage command value and a q-axis voltage command value,
a rotation angle estimation unit configured to calculate a rotation angle of the rotor of the motor from a d-axis current and a q-axis current that flow into the motor and from the d-axis voltage command value and the q-axis voltage command value, and a correction unit configured to: compare the d-axis current and the q-axis current, sequentially apply, for multiple angles, multiple voltage pulses for turning on the plurality of switching elements for predetermined switching patterns, to the motor when the motor is in a stopped state, and correct a parameter for control of the motor in accordance with the comparison result of the d-axis current and the q-axis current, which flow into the motor when the pulse voltage is applied, wherein the correction unit is further configured to estimate a saliency ratio, which is a ratio of a d-axis inductance to a q-axis inductance, from the d-axis current and the q-axis current, by using larger changes in the q-axis inductance than in the d-axis inductance, and to correct the parameter for control of the motor based on the saliency ratio, wherein the rotation angle estimation unit is configured to estimate an angle of the rotor from a U-phase current, a V-phase current, and a W-phase current that flow into the motor when the voltage pulses are applied.

2. The onboard fluid machine according to claim 1, wherein the correction unit is configured to correct a power voltage detection value of the inverter circuit serving as the parameter for the control.

3. The onboard fluid machine according to claim 1, wherein the correction unit is configured to correct the d-axis voltage command value and the q-axis voltage command value, which serve as the parameter for the control.

4. The onboard fluid machine according to claim 1, wherein the correction unit is configured to correct the d-axis inductance and the q-axis inductance that serve as the parameter for the control.

5. A control method for controlling an onboard fluid machine, the onboard fluid machine including an inverter device and a motor, wherein the control method comprises:

supplying, by an inverter circuit having a switching element, the motor with alternating-current power;

calculating, by a current controller of the inverter device, a d-axis voltage command value and a q-axis voltage command value;

calculating, by a rotation angle estimation unit, a rotation angle of a rotor of the motor from a d-axis current and a q-axis current that flow into the motor and from the d-axis voltage command value and the q-axis voltage command value, wherein the rotor of the motor includes a permanent magnet, the switching element is one of a plurality of switching elements that is respectively connected to a U-phase terminal, a V-phase terminal, and a W-phase terminal of the motor;

sequentially applying, by a correction unit of the inverter device, for multiple angles, multiple voltage pulses for turning on the switching elements for predetermined switching patterns to the motor when the motor is in a stopped state;

comparing, by the correction unit, the d-axis current and the q-axis current, which flow into the motor when the pulse voltage is applied; and correcting, by the correction unit, a parameter for control of the motor in accordance with a result of the comparison, wherein comparing the d-axis current and the q-axis current includes estimating, by the correction unit, a saliency ratio, which is a ratio of a d-axis inductance to a q-axis inductance, from the d-axis current and the q-axis current, by using larger changes in the q-axis inductance than in the d-axis inductance, and wherein correcting the parameter for control of the motor includes correcting, by the correction unit, the parameter for control of the motor based on the saliency ratio, wherein calculating the angle of the rotor includes estimating, by the rotation angle estimation unit, the angle of the rotor from a U-phase current, a V-phase current, and a W-phase current that flow into the motor when the voltage pulses are applied.

6. A non-transitory computer-readable storage medium that stores a program causing a processor to execute a control process for controlling an onboard fluid machine, wherein the control process comprises:

supplying, by an inverter circuit having a switching element, the motor with alternating-current power;

calculating, by a current controller of the inverter device, a d-axis voltage command value and a q-axis voltage command value;

calculating, by a rotation angle estimation unit, a rotation angle of a rotor of the motor from a d-axis current and a q-axis current that flow into the motor and from the d-axis voltage command value and the q-axis voltage command value;

applying, by a correction unit of the inverter device, a pulse voltage to the motor when the motor is in a stopped state;

comparing, by the correction unit, the d-axis current and the q-axis current, which flow into the motor when the pulse voltage is applied; and correcting, by the correction unit, a parameter for control of the motor in accordance with a result of the comparison, wherein in the control process, the comparing the d-axis current and the q-axis current includes estimating, by the correction unit, a saliency ratio, which is a ratio of a d-axis inductance to a q-axis inductance, from the d-axis current and the q-axis current, and by using larger changes in the q-axis inductance than in the d-axis inductance, and wherein correcting the parameter for control of the motor includes correcting, by the correction unit, the parameter for control of the motor based on the saliency ratio, wherein calculating the angle of the rotor includes estimating, by the rotation angle estimation unit, the angle of the rotor from a U-phase current, a V-phase current, and a W-phase current that flow into the motor when the voltage pulses are applied.

* * * * *